United States Patent [19]

Kubis

[11] Patent Number: 4,621,594
[45] Date of Patent: Nov. 11, 1986

[54] SINGLE-CIRCUIT COOLING SYSTEM FOR INTERCOOLED MARINE ENGINES

[75] Inventor: Heribert Kubis, Nuremberg, Fed. Rep. of Germany

[73] Assignee: M.A.N. Maschinenfabrik Augsburg-Nürnberg Aktiengesellschaft, Nuremberg, Fed. Rep. of Germany

[21] Appl. No.: 774,640

[22] Filed: Sep. 11, 1985

[30] Foreign Application Priority Data

Sep. 11, 1984 [DE] Fed. Rep. of Germany ....... 3433319

[51] Int. Cl.$^4$ .............................................. F01P 7/16
[52] U.S. Cl. .............................. 123/41.09; 123/41.29; 123/41.31
[58] Field of Search ............... 123/41.02, 41.08, 41.09, 123/41.1, 41.29, 41.31; 236/34.5

[56] References Cited

U.S. PATENT DOCUMENTS

| | | | |
|---|---|---|---|
| 3,125,081 | 3/1964 | Jasper | 123/41.09 |
| 3,380,466 | 4/1968 | Sarra | 123/41.09 |
| 3,780,712 | 12/1973 | Pace | 123/41.31 |
| 3,863,612 | 2/1975 | Wiener | 123/41.09 |
| 3,872,825 | 3/1975 | Deutschmann | 123/41.31 |
| 3,892,209 | 7/1975 | Amiot | 123/41.09 |
| 4,410,133 | 10/1983 | Furukubo | 236/34.5 |

Primary Examiner—William A. Cuchlinski, Jr.
Attorney, Agent, or Firm—Becker & Becker, Inc.

[57] ABSTRACT

A common coolant circuit for cooling an internal combustion engine, on the one hand, and the charge air and possibly other media, on the other hand. In order to achieve a constant positive flow through the charge air cooler (intercooler) of a coolant which is at a low temperature level of 45° C. or less and, respectively, to ensure rapid heating of the engine after cold starting, a single four-way thermostat incorporating a double valve is provided. In the cold starting mode, the valve causes a bypass operation of the coolant in the cooling jacket of the engine and the coolant in the common cooling circuit, in conjunction with a separate coolant pump for each. In the hot operating mode, the valve controls circulation of a pre-determined coolant flow in the cooling circuit. The thermostat element of the thermostat is constantly exposed, during this process, to a pre-determined coolant flow from the cooling jacket of the engine (more specifically the coolant outlet of the engine).

9 Claims, 1 Drawing Figure

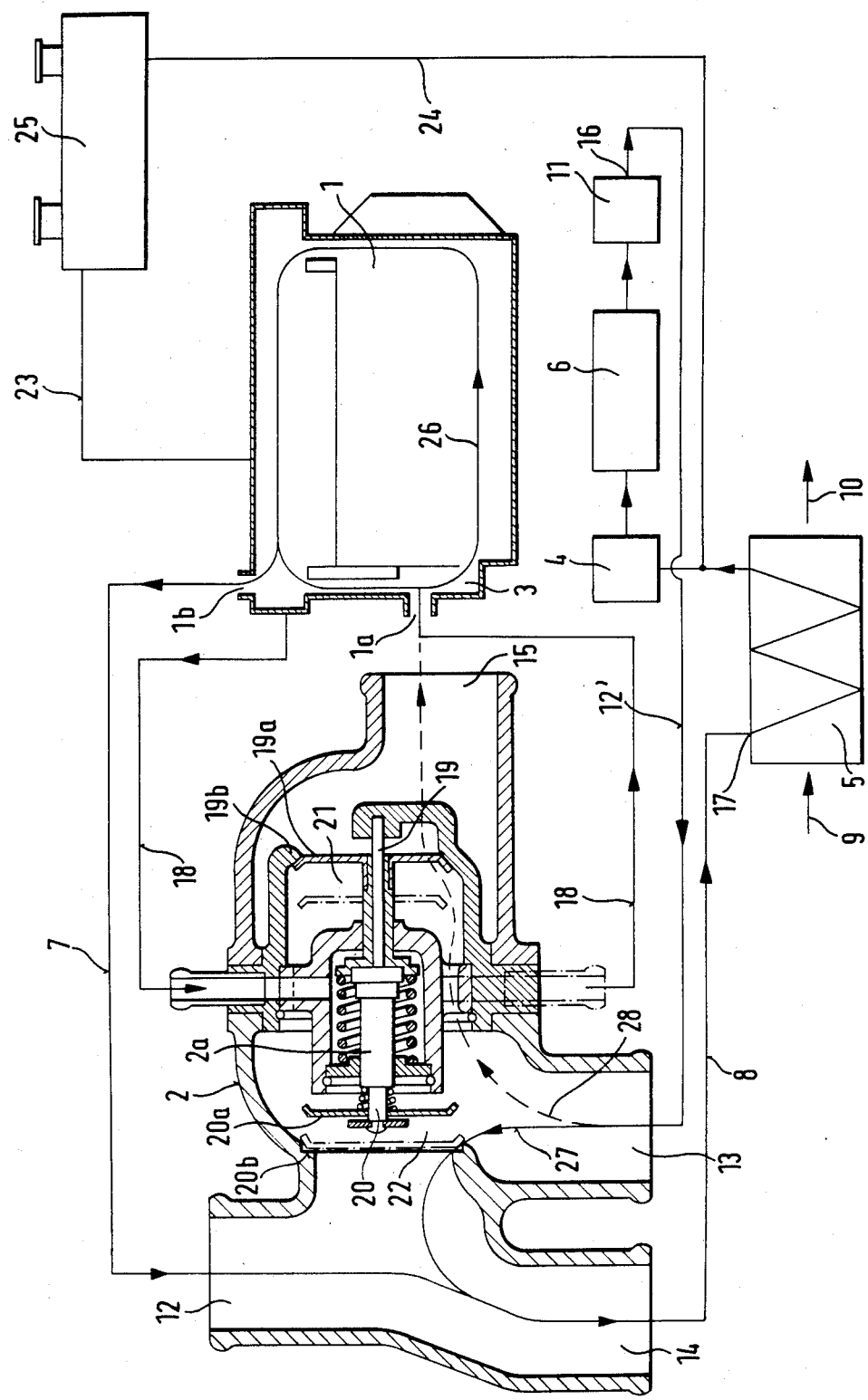

SINGLE-CIRCUIT COOLING SYSTEM FOR INTERCOOLED MARINE ENGINES

BACKGROUND OF THE INVENTION

The present invention relates to a cooling system having a common cooling circuit for cooling the internal combustion engine, on the one hand, and the charge air and possibly other media, on the other hand; wherein the discharge of the coolant from the engine is controlled by means of a thermostat, and the coolant leaving the engine is then returned successively through a so-called skin cooler (which is operated on raw water) an intercooler (aftercooler), and possibly other coolers back into the cooling jacket of the engine. A cooling system of this general type is disclosed in German Preliminary Pat. No. 1 476 384.

As a rule, water-cooled marine Diesel engines are cooled by means of fresh water, which is circulated in a closed circuit through the cooling jackets of the engine by means of a water pump driven by the internal combustion engine, and which is subsequently subjected to a heat exchange process. The heat exchange process takes place in a cooler (shell-and-tube water-to-water cooler) which is operated on raw or untreated water (e.g. fresh or salt water). In view of increasing water pollution, river and coastal vessels increasingly resort to skin-cooling systems. In these systems, the engine jacket water is cooled in a skin cooler which is fitted in the hull and which dissipates the heat to the water through which the vessel moves.

The use of untreated water for cooling is attractive in the case of marine engines, if only because the cooling water is available at a low temperature level (the temperature of the river or sea), which is important in view of the desired and necessary cooling of the charge air for a high engine output.

Where a common cooling circuit is adopted for cooling the internal combustion engine, on the one hand, and the charge air and possibly other media (e.g. the engine and gear oil), on the other hand, it is necessary to maintain the engine or combustion temperature at a higher level than that of the charge air and/or other media. The temperatures for the jacket coolant are roughly between 78° and 85°C., whereas the temperature of the charge air has to be maintained at a level below or equal to 45° C.

Common cooling circuits which solve this problem have been disclosed.

For instance, the published European patent application No. 54792 shows a cooling circuit where, in order to ensure a good heat transfer rate, the full engine coolant flow is passed through an air/water main cooler to be then subdivided into two partial flows. One of these flows is routed through a cooler which is constructed as a secondary cooler and an intercooler or charge air cooler for the charge air circuit, and then is united again with the other partial flow (the main or jacket water circuit) before entering the internal combustion engine. The split-up is effected either by an "expensive" partial flow control valve, which is controlled as a function of temperature or time, or by a (simplified) flow control valve (variable-area orifice) that is provided in the secondary circuit and is controlled by the system pressure or temperature.

A drawback of this arrangement is the fact that, in addition to the intercooler, another cooler (i.e. a secondary cooler) is required, and that another partial flow control valve, which is dimensioned for the complete circulating water flow and is located upstream of the air/water main cooler, is needed for the warming-up phase of the internal combustion engine. Moveover, the proposed splitting of the flow by means of the second partial flow or flow control valve is extremely problematic, especially in the case of engines with a wide operating speed range and with the commonly used constant drive ratio of the water pump driven by the engine, since the flow pressure varies widely as a function of the water pump speed. Due to the control inertia, dangerous operating conditions are liable to occur in the intercooler under conditions of drastic load changes.

Another prior disclosure provides for a liquid circuit of a supercharged internal combustion engine with positive circulation of the coolant successively through the engine, radiator, and intercooler, and for a bypass around both coolers, which is characterized by the coolant flow leaving the engine and being split into two partial flows, each of which is controlled by a control valve. One control valve is controlled as a function of the charge air temperature in the intercooler and the other control valve is controlled as a function of the temperature of the coolant entering the engine. Each control valve is formed with two outlet channels, of which one outlet channel joins the bypass line around the coolers and one outlet channel joins the line leading to the water cooler (German Preliminary Pat. No. 1 476 384).

A drawback of this cooling system, which incidentally uses a skin cooler, is the fact that two control valves are used, which are controlled as indicated in the foregoing. As a result of this, this system fails to achieve the quick warming-up required for high-performance engines after start-up (i.e. it is impossible to attain the correct operating temperature within a few minutes). This is due to the fact that since, when the charge air is hot, a portion of the cooling water is withdrawn from the engine circuit and is then intensively cooled in the main cooler (radiator) to be subsequently heated again, but only slightly, in the intercooler and the oil cooler.

It is therefore an object of the present invention to provide a cooling circuit of the aforementioned general type defined above, and of the simplest construction possible. It is a further object of the invention to provide rapid (i.e. within a few minutes) warming-up after cold starting for high-performance engines where the engine loading varies within extremely wide limits, and to ensure that maintaining the temperature of the engine at partial load is not affected by the intercooler or charge air cooler. It is also an object of the present invention to maintain intensive cooling of the charge air, since the charge air cooler is capable immediately (i.e. without any time lag) of handling the full cooling load, such as is required under conditions of frequent abrupt load changes.

BRIEF DESCRIPTION OF THE DRAWING

These and other objects and advantages of the present invention will appear more clearly from the following specification in conjunction with the accompanying drawing, in which the four-way thermostat of the inventive cooling system is schematically illustrated, and is enlarged for ease of viewing.

SUMMARY OF THE INVENTION

The invention is characterized primarily in that a single four-way thermostat is provided with two inlets and two outlets, whose control element (or thermostat insert) is continuously and directly enveloped by the coolant which also flows through and accepts heat from the cooling jacket of the internal combustion engine. The thermostat is closed during the warming-up phase of the engine whereby, on the one hand, the coolant enveloping the engine is circulated by means of a first coolant pump in a straight bypass mode and, on the other hand, the coolant existing in the common cooling circuit is circulated by means of a second coolant pump, also in a straight bypass mode. At the operating temperature of the engine, with the thermostat open, only about one quarter of the coolant flow required for the engine circuit enters the common cooling circuit.

This results in a constant positive flow of coolant through the charge air cooler, with the coolant having a low temperature level of 45° C. or less, whereby dangerous operating conditions are avoided in the charge air cooler. Thermal overloading of high-performance engines subject to extreme transient loads is thereby avoided. At the same time, very rapid warming-up of the engine is achieved after a cold start, since heating of the charge air by heat dissipation from the engine coolant is deliberately avoided. The use of the four-way thermostat according to the invention enables expensive flow control valves activated by sensors to be dispensed with. The thermostat referred to also provides engine temperature control. This is effected by the controlled admission of a low temperature coolant from the charge air cooling circuit and by having only approximately one quarter of the coolant flow required for the engine circuit circulating in the common cooling circuit. This affords the added advantage of a small and low-cost coolant pump in the charge air cooling circuit (common cooling circuit), a small thermostat, and small pipe bores.

Further advantageous features of the invention will be described subsequently in the specification.

DESCRIPTION OF PREFERRED EMBODIMENTS

Referring now to the drawing in detail, the present invention encompasses a common coolant circuit for engine cooling and for charge air cooling (for example, by inter or aftercooler) for an internal combustion or gasoline engine 1. The coolant flow circulates in a closed circuit which is controlled by means of a single four-way thermostat 2. In addition to this thermostat, the circuit is equipped with a first coolant pump 3 and a second coolant pump 4.

The first coolant pump 3 is provided ahead of the internal combustion engine 1 at the coolant inlet 1a, and the second coolant pump 4 is provided within the common circuit, or more exactly, in the charge air cooling circuit between the so-called skin cooler 5 and the charge air cooler (intercooler) 6. The coolant leaving the engine 1 (via coolant outlet 1b) is taken by means of the line 7 to the thermostat 2, and then is delivered via the line 8 successively through the already mentioned skin cooler 5, which is operated on untreated water (in connection with an untreated water supply 9 and an untreated water discharge 10). The coolant then flows into the charge air cooler 6 and proceeds from there into the oil cooler 11 (which cools the engine and gear oil); the coolant is led back from there via the line 12' to the thermostat 2. The thermostat 2 has two inlets 12, 13 and two outlets 14, 15. The inlet 12 communicates with the coolant outlet 1b of the engine 1, and the inlet 13 communicates via line 12' with the coolant outlet 16 which exits from the coolers 5, 6, 11. The coolant flow from outlet 14 of the thermostat 2 is guided via the line 8 to the coolant inlet 17, which leads into the coolers 5, 6, 11, and the flow from the other outlet 15 is conveyed to the coolant inlet 1a of the engine 1. Inside the thermostat, there is a thermostat insert or element 2a which, by means of a control line 18, is exposed continuously to a certain pre-determined amount (for example, 10 to 20 liters/min) of the coolant which was contained and heated in the cooling jacket of the engine 1. The control line 18 extends from the coolant outlet 1b of the engine 1 to join the coolant inlet 1a of the engine 1 again.

The thermostat element 2a controls a double valve consisting of a valve 19 and a valve 20 whereby, when one valve is fully closed, the other valve is fully opened. During the warming-up phase (after a cold start) the valve 19 is closed, i.e. the valve disk 19a contacts the valve seat 19b and blocks the opening 21 to the outlet 15, which leads to the coolant inlet 1a of the engine 1. At operating temperature of the engine (i.e. hot operation), however, the valve disk 20a contacts the valve seat 20b and blocks the bypass opening 22, which is provided inside the thermostat 2, and which communicates with the outlet 14 of the thermostat 2.

The maximum coolant flow circulating in the common circuit is approximately one quarter of the coolant amount required for the actual entire engine circuit. This flow is controlled by a corresponding sizing of the pump 4 and the associated pipework.

The drawing also shows vent and filling pipes 23, 24 for the engine cooling jacket and the skin cooler, which communicate with a single cooling water surge vessel or equalizing coolant reservoir 25.

The above-described cooling system operates as follows in the different operating modes:

During the warming-up phase after a cold start (as shown in the drawing), the charge air circuit is separated completely from the engine circuit by the thermostat 2. The valve 19 is fully closed and the valve 20 is fully open (i.e. the passage through the bypass opening 22 is free). In this manner, the coolant enveloping the engine 1 is circulated in a straight bypass mode or operation by means of the first coolant pump 3 (see flow at 26) at a rate of, for example, 1000 liters/min. The coolant contained in the common cooling circuit (in this case the charge air cooling circuit only) is also circulated in a straight bypass mode (see flow at 27) by means of the second cooling pump 4. In this manner, the correct engine coperating temperature is attained within a few minutes and immediate operational readiness of the charge air cooler is assured, since the temperature of the coolant, which is flowing into the charge air cooler 6 and which previously passed through the skin cooler 5, will invariably be less than 45° C.

When the coolant circuit operating in the bypass mode reaches an operating temperature of about 79° C. (with the thermostat element 2a being continuously supplied with coolant via the control line 18), the valve disk 19a, which is closed in the cold starting mode, will start to open and, simultaneously, the bypass disk 20a, which is open in the cold starting mode, will start to close. As a result, the coolant which has a low temperature level and which comes from the charge air cooling circuit, will be mixed with the engine coolant in the first coolant pump 3. In order to positively avoid dangerous operating conditions in the charge air cooling circuit, the coolant so added will, after leaving the last cooler (oil cooler 11), have a temperature of not more than 49° C., in order to prevent the maximum permissible charge air temperature being exceeded under conditions of sudden full load acceptance. This temperature level is uncompromisingly insisted upon for high-performance engines with abrupt load and speed changes, with a view to avoiding thermal overloading. Since only approximately one quarter of the coolant flow required for the engine circuit flows in the common cooling circuit (i.e. about 250 liters/min ), this requirement is readily met.

As already mentioned, control of the engine temperature is also by thermostat-controlled admission of coolant from the charge air circuit at a low temperature level, where only approximately one quarter (approximately 250 liters/min) of the coolant flow required for the engine circuit is circulated. When the engine coolant has reached a temperature of about 85° C. (operating temperature), the bypass opening 22 in the thermostat 2 is completely closed and the opening 21 is fully open (as is indicated by the dotted line). In other words, an amount of 250 liters/min of coolant is branched off or diverted from the coolant outlet 1b of the engine 1 and, after flowing through the coolers 5, 6, 11, is fed to the cooling jacket (via coolant inlet 1a) of the engine 1 (see flow at 28). At temperatures between 79° and 85° C., only part of the coolant flow is returned into the engine, whereas the remainder is circulated through the bypass. On the strength of the particular setting of the valves 19, 20 of the thermostat element 2a which controls the openings 21, 22, the pre-determined operating temperature of the engine coolant is requlated; i.e. in the present case the coolant temperature is prevented from rising above 85° C. at the coolant outlet 1b of the engine.

The present invention is, of course, in no way restricted to the specific disclosure of the specification and drawing, but also encompasses any modifications within the scope of the appended claims.

What is claimed is:

1. A cooling system which includes a common cooling circuit which is provided with coolant for cooling an internal combustion engine and charge air for said engine, wherein said coolant is discharged from said engine, with said discharged coolant being controlled by means of a thermostat, and with said discharged coolant being returned to a cooling jacket which is provided on said engine, the improvement comprising:

a single four-way thermostat which is provided with two inlets, two outlets, and a thermostat element, as a control element, which is continuously and directly exposed to said coolant from said cooling jacket of said engine;

a first coolant pump which circulates said coolant in a straight bypass mode which bypasses said common cooling circuit when said thermostat occupies a closed position during warm-up of said engine; and a second coolant pump which circulates said coolant in a straight bypass mode which bypasses said thermostat when said thermostat is in a closed position, said second coolant pump furthermore circulates said coolant through said common cooling circuit which includes, successively arranged, a skin cooler and at least one charge air cooler; after said warm-up of said engine, said thermostat occupies an open position, with approximately one quarter of the total amount of coolant being circulated through said common cooling circuit.

2. A cooling system for cooling an internal combustion engine and charge air for said engine via a coolant, comprising:

an engine circuit for circulating a portion of said coolant around said engine;

a first coolant pump for effecting circulation within said engine circuit;

a common cooling circuit which includes a skin cooler and a charge air cooler;

a second coolant pump for circulating a portion of said coolant within said common cooling circuit; and a single four-way thermostat which includes a first and a second inlet and a first and a second outlet, and is provided with a thermostat element as a control element; said thermostat being adapted to move from a closed to an open position as a function of temperature, with said sensor being continuously and directly exposed to coolant from said engine circuit to sense the temperature thereof; during warm-up of said engine, said thermostat occupies said closed position and said first coolant pump circulates said coolant of said engine circuit in a straight bypass mode which bypasses said common cooling circuit, while said second coolant pump circulates said coolant of said common cooling circuit in a straight bypass mode which bypasses said thermostat; after warm-up of said engine, said thermostat occupies said open position and said second coolant pump circulates coolant through said thermostat into said engine circuit, with coolant from said engine circuit flowing into said common cooling circuit; when said thermostat occupies said open position, approximately one quarter of the total amount of said coolant is circulated through said common cooling circuit at any given time.

3. A cooling system according to claim 2, which includes an engine outlet and an engine inlet; and which includes a control line which accommodates a predetermined flow of said coolant from said engine circuit and extends from said engine outlet to said thermostat sensor, and from the latter to said engine inlet.

4. A cooling system according to claim 3, in which said thermostat includes a double valve for effecting said open and said closed positions, with said thermostat element acting on said double valve in such a way that when one valve is closed, the other valve is open.

5. A cooling system according to claim 4, in which said double valve includes a first valve and a second valve; in which said thermostat includes a first opening which is controlled by said first valve in such a way that, when said thermostat is in said closed position, said first valve closes said first opening to effect said bypass modes of said engine and said common cooling circuits, and when said thermostat is in said open position, said first valve opens said first opening to allow coolant from said common coolant circuit to flow through said thermostat into said engine circuit; and in which said thermostat includes a second opening which is controlled by said second valve in such a way that, when said thermostat is in said closed position, said second valve opens said second opening to effect said bypass modes of said engine and said common cooling circuits, and when said thermostat is in said open position, said second valve closes said second opening to allow coolant from said common coolant circuit to flow through said thermostat into said engine circuit.

6. A cooling system according to claim 5, in which said engine outlet communicates with said first inlet of said thermostat, in which said first outlet of said thermostat communicates with said common cooling circuit, in which said common cooling circuit communicates with said second inlet of said thermostat, and in which said second outlet of said thermostat communicates with said engine inlet.

7. A cooling system according to claim 2, in which said first coolant pump is provided at said engine inlet.

8. A cooling system according to claim 2, in which said second coolant pump is disposed in said common cooling circuit.

9. A cooling system according to claim 8, in which said second coolant pump is positioned between and communicates with said skin and said charge air coolers.

* * * * *